United States Patent
Takegahara et al.

(10) Patent No.: US 6,445,972 B1
(45) Date of Patent: Sep. 3, 2002

(54) MACHINING SEQUENCE DETERMINING METHOD AND APPARATUS FOR WIRE-CUT ELECTRIC DISCHARGE MACHINING AND COMPUTER READABLE MEDIUM STORING A MACHINING SEQUENCE DETERMINING PROGRAM

(75) Inventors: Takashi Takegahara, Hachiouji; Shigetoshi Takagi; Koji Suzuki, both of Yamanashi, all of (JP)

(73) Assignee: Fanuc, Ltd., Yamanashi (JP)

( * ) Notice: Subject to any disclaimer, the term of this patent is extended or adjusted under 35 U.S.C. 154(b) by 0 days.

(21) Appl. No.: 09/258,345

(22) Filed: Feb. 26, 1999

(30) Foreign Application Priority Data

Feb. 26, 1998 (JP) .......................................... 10-060376

(51) Int. Cl.$^7$ ............................................. G05B 11/01
(52) U.S. Cl. ...................................... 700/162; 700/182
(58) Field of Search ................................ 700/180, 192, 700/175, 184, 110, 172, 82, 83, 182, 183, 173, 162; 318/567, 568.25

(56) References Cited

U.S. PATENT DOCUMENTS

| | | | |
|---|---|---|---|
| 4,794,514 A | 12/1988 | Hideaki et al. | 700/180 |
| 5,113,050 A * | 5/1992 | Seki et al. | 700/182 |
| 5,485,390 A | 1/1996 | LeClair et al. | 700/182 |
| 5,526,272 A | 6/1996 | Kondo et al. | 700/177 |
| 5,815,400 A * | 9/1998 | Hirai et al. | 700/183 |
| 6,243,619 B1 * | 6/2001 | Inamasu et al. | 70/180 |

FOREIGN PATENT DOCUMENTS

| | | |
|---|---|---|
| EP | 0 499 905 A2 | 8/1992 |
| EP | 0 664 186 A1 | 7/1995 |

* cited by examiner

Primary Examiner—William Grant
Assistant Examiner—Kidest Bahta
(74) Attorney, Agent, or Firm—Staas & Halsey (57) ABSTRACT

A method of and an apparatus for determining a machining sequence of wire-cut electric discharge machining capable of easily changing a machining sequence in continuously machining a plurality of machining shapes. By making a sequence of a combination of a shape to be machined and a machining stage for the shape to be machined capable of being edited, the machining sequence in the case where the plurality of machining shapes are machined continuously is made easily changeable. In the method for specifying the machining sequence, two different modes are available. In a first mode, a plurality of standard machining patterns are prepared in advance, and the machining pattern is changed to form a desired machining pattern. In a second mode, a sequence of a combination of a plurality of shapes to be machined and the machining stages for a selected machining pattern is changed to form a desired machining pattern.

11 Claims, 10 Drawing Sheets

SELECTION MACHINING PATTERN

FIG. 4

SELECT (THE NUMBER OF) MACHINING SHAPES

FIG. 5

SELECTED PATTERN

A: ROUGH MACHINING
A: SEMI-FINISH MACHINING
A: FINISH MACHINING
A: CUTTING-OFF
B: ROUGH MACHINING
B: SEMI-FINISH MACHINING
B: FINISH MACHINING
B: CUTTING-OFF
C: ROUGH MACHINING
C: SEMI-FINISH MACHINING
C: FINISH MACNINING
C: CUTTING-OFF

A: ROUGH MACHINING
A: SEMI-FINISH MACHINING
A: FINISH MACHINING
C: ROUGH MACHINING
C: SEMI-FINISH MACHINING
C: FINISH MACHINING
B: ROUGH MACHINING
B: SEMI-FINISH MACHINING
B: FINISH MACHINING
A: CUTTING-OFF
B: CUTTING-OFF
C: CUTTING-OFF

EXPLICATION OF
MACHINING STAGES

ALTERATION OF MACHINING
STAGES

SELECTION OF (THE NUMBER, POSITION OF) MACHINING SHAPES

FIG. 8

SHAPE A
```
A:ROUGH MACHINING
A:SEMI-FINISH MACHINING
A:FINISH MACHINING
A:CUTTING-OFF
```

SHAPE B
```
B:ROUGH MACHINING
B:SEMI-FINISH MACHINING
B:FINISH MACHINING
B:CUTTING-OFF
```

SHAPE C
```
C:ROUGH MACHINING
C:SEMI-FINISH MACHINING
C:FINISH MACHINING
C:CUTTING-OFF
```

ALTERATION

```
A:ROUGH MACHINING
B:ROUGH MACHINING
C:ROUGH MACHINING
A:SEMI-FINISH MACHINING
B:SEMI-FINISH MACHINING
C:SEMI-FINISH MACHINING
A:FINISH MACHINING
B:FINISH MACHINING
C:FINISH MACHINING
A:CUTTING-OFF
B:CUTTING-OFF
C:CUTTING-OFF
```

FIG. 9a

SHAPE S1

(1) ROUGH MACHINING
(2) SEMI-FINISH MACHINING (TWICE)
(3) FINISH MACHINING
(4) CUTTING-OFF

FIG. 9b

SHAPE S2

(1) ROUGH MACHINING
(2) SEMI-FINISH MACHINING
(3) CUTTING-OFF

FIG. 10a (1) SHAPE S1:ROUGH MACHINING
(2) SHAPE S1:SEMI-FINISH MACHINING (TWICE)
(3) SHAPE S1:FINISH MACHINING
(4) SHAPE S1:CUTTING OFF
(5) SHAPE S2:ROUGH MACHINING
(6) SHAPE S2:FINISH MACHINING
(7) SHAPE S2:CUTTING-OFF

FIG. 10b (1) SHAPE S1:ROUGH MACHINING
(2) SHAPE S2:ROUGH MACHINING
(3) SHAPE S2:FINISH MACHINING
(4) SHAPE S1:SEMI-FINISH MACHINING (TWICE)
(5) SHAPE S1:FINISH MACHINING
(6) SHAPE S1:CUTTING-OFF
(7) SHAPE S2:CUTTING-OFF

MACHINING SEQUENCE DETERMINING METHOD AND APPARATUS FOR WIRE-CUT ELECTRIC DISCHARGE MACHINING AND COMPUTER READABLE MEDIUM STORING A MACHINING SEQUENCE DETERMINING PROGRAM

BACKGROUND OF THE INVENTION

1. Field of the Invention

The present invention relates to a method of and an apparatus for determining a machining sequence for a wire-cut electric discharge machine, and more particularly to a method and an apparatus for determining a machining sequence in continuously machining a plurality of machining shapes.

2. Description of the Related Art

A wire-cut electric discharge machine performs machining of the machining shapes of parts, dies, etc. from a workpiece through respective machining stages such as rough machining, semi-finish machining, finish machining and cut-off machining. In each of these stages, the wire-cut electric discharge machine performs electric discharge machining by combining basic operations including an operation for sending a wire electrode from an approach start point (machining start hole) to an approach point, a contour machining operation for machining a contour of machining shape, and an evacuating operation for evacuating the wire electrode from an evacuation start point on the machining shape to an evacuation point.

On the aforementioned wire-cut electric discharge machine, when a plurality of machining shapes included in parts and dies are machined continuously, it is necessary to select the machining sequence of performing the machining stages such as rough machining, semi-finish machining, finish machining, and cut-off machining for each machining shape so that the sequence is optimum according to the object to be machined and the various machining conditions such as required machining accuracy and operation efficiency. Various machining sequences can be selected. For example, a machining sequence, in which the machining stages such as rough machining, semi-finish machining, finish machining, and cut-off machining are performed for all machining shapes, can be selected. Alternatively, a machining sequence, in which after one machining stage is executed for some machining shapes of the plurality of machining shapes, another machining stages are performed for other machining shape groups, may be selected.

Figure 9A:
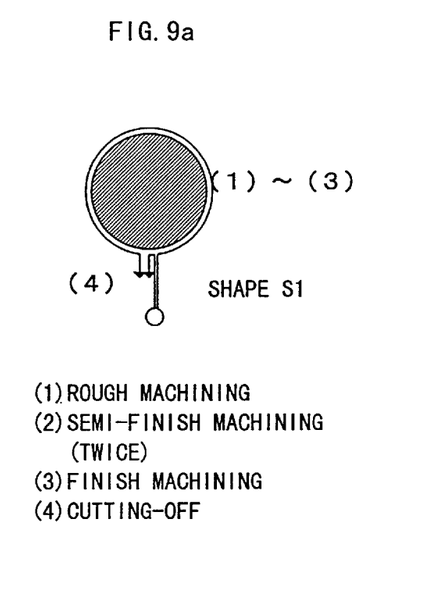
FIGS. 9a and 9b and FIGS. 10a and 10b are views for illustrating a machining sequence for a plurality of machining shapes.
Figure 9B:
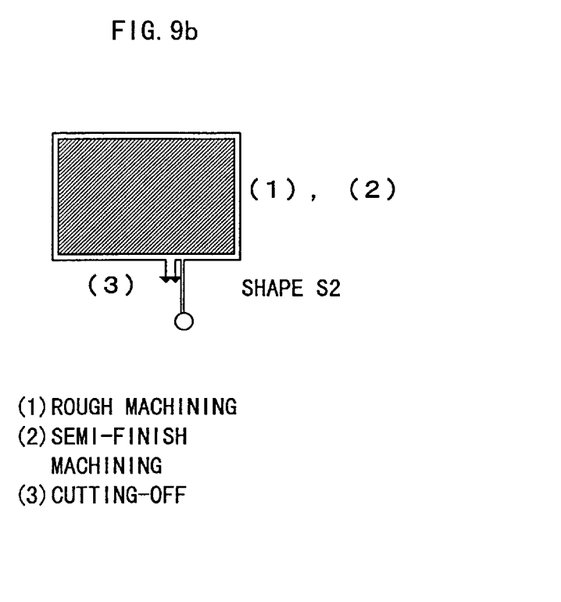

FIGS. 9a and 9b and FIGS. 10a and 10b illustrates the machining sequences for the plurality of machining shapes in a case where two machining shapes are machined continuously. FIG. 9a shows a case where a machining shape S1 is machined in a machining sequence of (1) rough machining, (2) two cycles of semi-finish machining, (3) finish machining, and (4) cut-off machining. FIG. 9b shows a case where a machining shape S2 is machined in a machining sequence of (1) rough machining, (2) finish machining, and (3) cut-off machining.

Figure 10A:
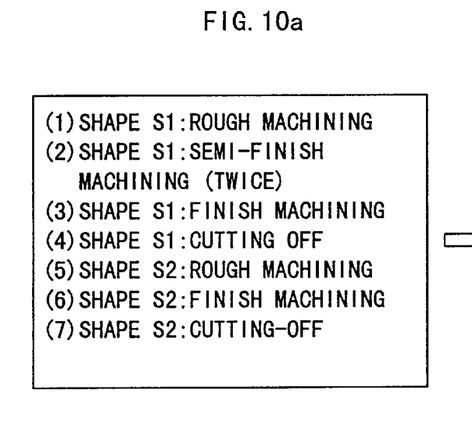
Figure 10B:
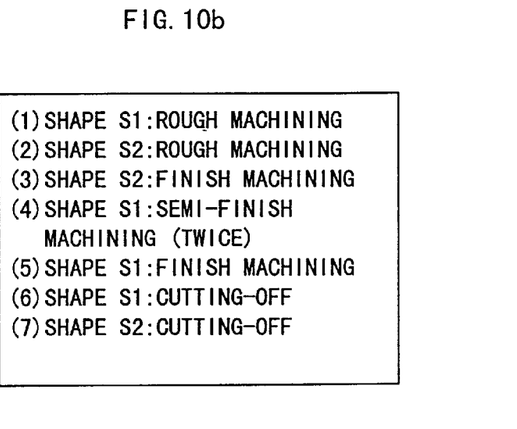

When the aforementioned two machining shapes are machined continuously, FIG. 10a shows a machining sequence in which the machining shape S1 is first subjected to rough machining, two cycles of semi-finish machining, finish machining, and cut-off machining and then the machining shape S2 is subjected to rough machining, finish machining, and cut-off machining. On the other hand, FIG. 10b shows a machining sequence in which after the machining shape S1 is subjected to rough machining, the machining shape S2 is continuously subjected to rough machining and finish machining, the machining shape S1 is subjected to two cycles of semi-finish machining, finish machining, and cut-off machining, and then the machining shape S2 is subjected to cut-off machining.

Figure 11:
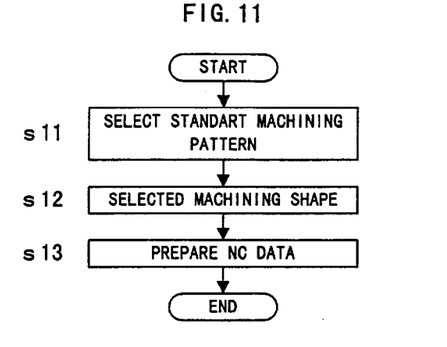
FIG. 11 is a flowchart for illustrating a conventional method for setting a machining sequence using a standard machining pattern.
Figure 14:
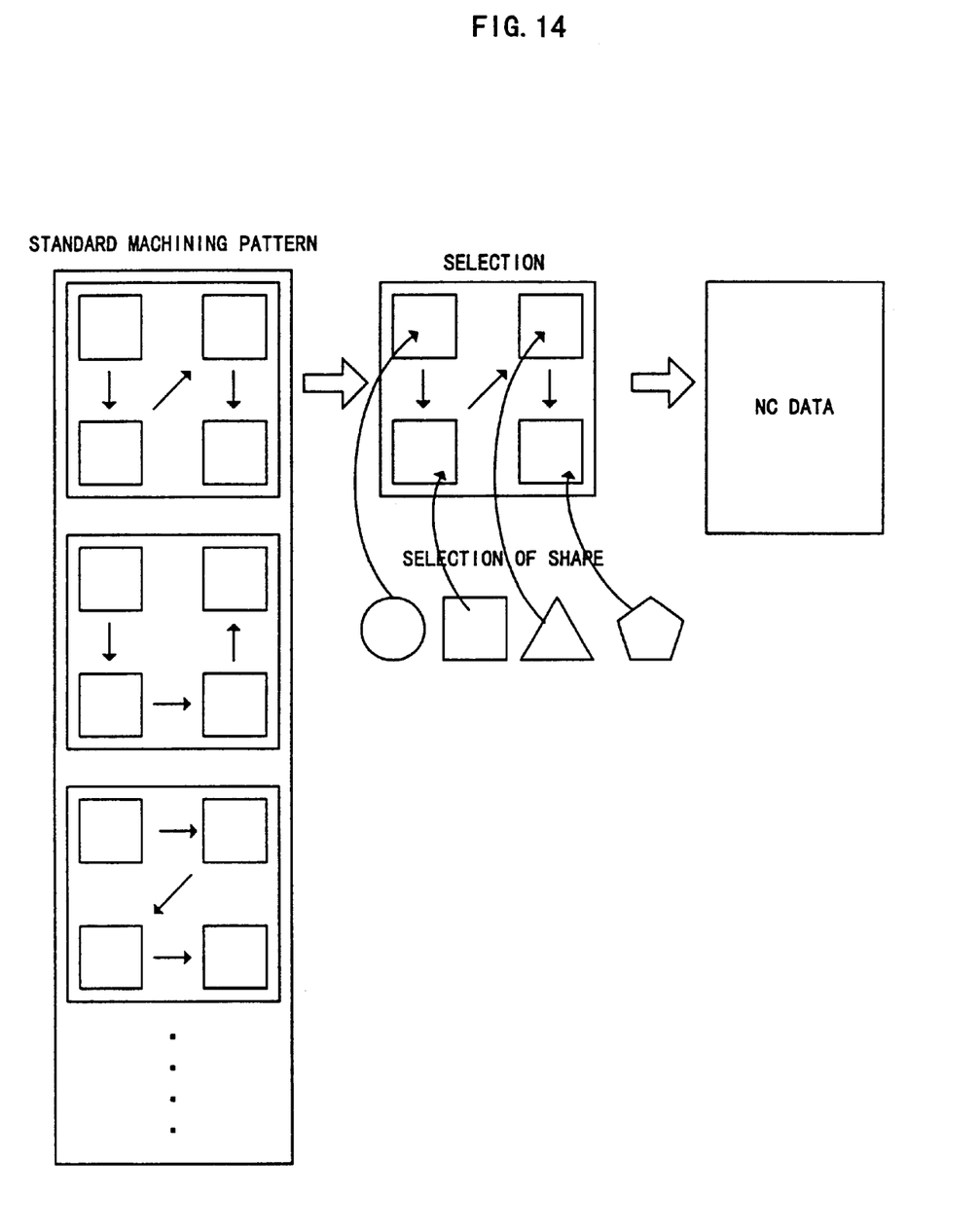
FIG. 14 is a view for illustrating a conventional method for setting a machining sequence using a standard machining pattern.

Concerning the machining sequence shown in FIG. 10a, there has been known a method for setting a machining sequence in which the machining sequences are classified into a plurality of patterns used as standards, and the standard machining pattern is used. FIG. 11 is a flowchart for illustrating a conventional method for setting a machining sequence using a standard machining pattern, and FIG. 14 is a view for illustrating this method. In FIGS. 11 and 14, the plurality of machining patterns used as standards are prepared in advance as the standard machining patterns. In the standard machining patterns, the sequence of performing the machining stages for each shape has been determined. In the process shown in FIG. 11, a standard machining pattern is selected (Step S11), a machining shape is selected (Step S12), and NC data are prepared (Step S13).

When a plurality of machining shapes included in parts and dies are machined continuously on the wire-cut electric discharge machine, the aforementioned method, in which a machining sequence is set by using a standard machining pattern, has a problem in that machining can be performed only in the sequence defined by the standard machining pattern prepared in advance, and an arbitrary machining sequence other than the standard machining patterns cannot be selected.

Figure 12:
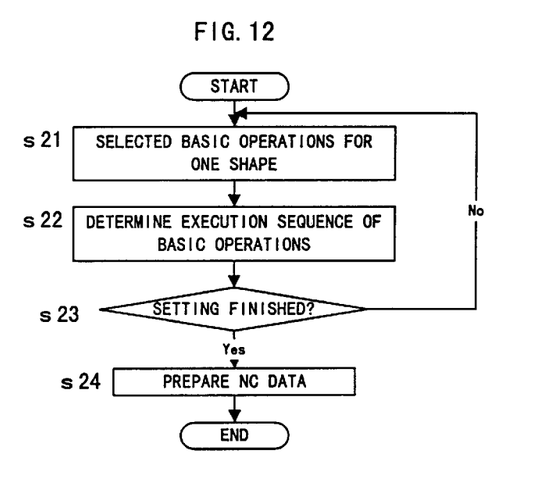
FIG. 12 is a flowchart for illustrating a process for changing an execution sequence of basic operations.
Figure 15:
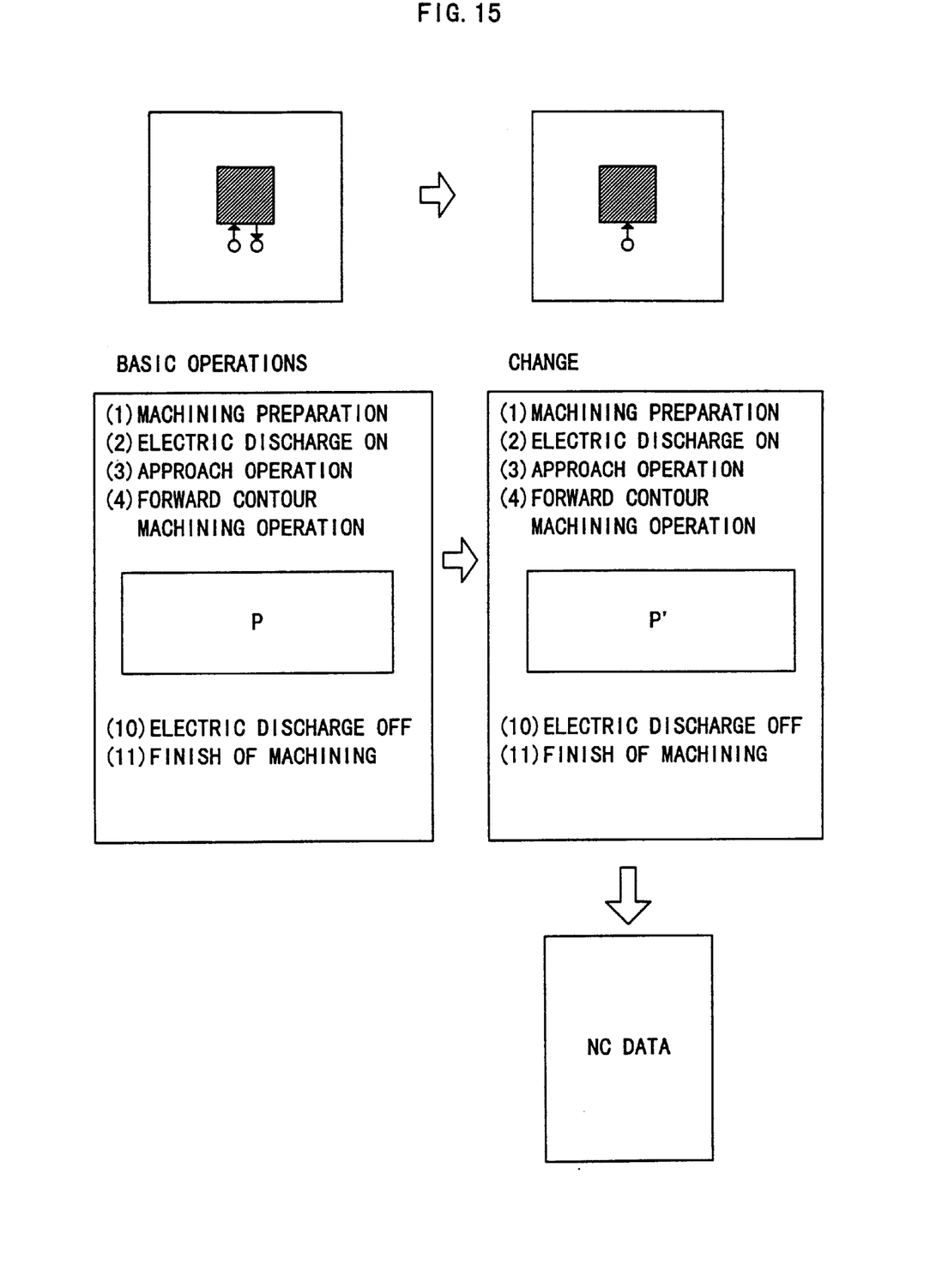
FIG. 15 is a view for illustrating a process for changing an execution sequence of basic operations.

A change of execution sequence of basic operations constituting the machining stage has also been known, and the process therefor is shown in a flowchart of FIG. 12. FIG. 15 is a view for illustrating the process. In FIGS. 12 and 15, basic operations for one machining shape is selected (Step S21), operations to be changed are selected from the process of the selected basic operations (P in FIG. 15), the execution sequence of the operations is changed (P' in FIG. 15), the execution sequence of basic operations is changed (Steps S22 and S23), and NC data are prepared (Step S24).

However, the aforementioned change of basic operations is a change for one machining shape, and also a change for each machining stage, so that the execution sequence of the plurality of machining shapes and the execution sequence of machining stages of machining shapes cannot be changed. Therefore, the edition of machining sequence of continuously machining the plurality of machining shapes cannot be performed. That is to say, it is difficult to specify the execution sequence of the machining stages of rough machining, semi-finish machining, finish machining, and cut-off machining for any number of machining shapes.

Also, in the conventional setting of machining sequence, the existing standard machining patterns are normally used. For this reason, when a machining sequence other than the existing machining patterns is set, it is thought that a new machining pattern is prepared by forming NC data for each machining shape and registering it and by joining the registered NC data.

Figure 13:
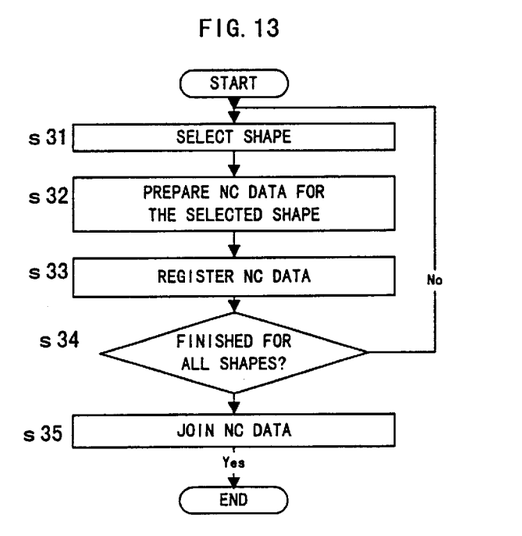
FIG. 13 is a flowchart for illustrating a process for setting a machining sequence other than existing machining patterns.
Figure 16A:
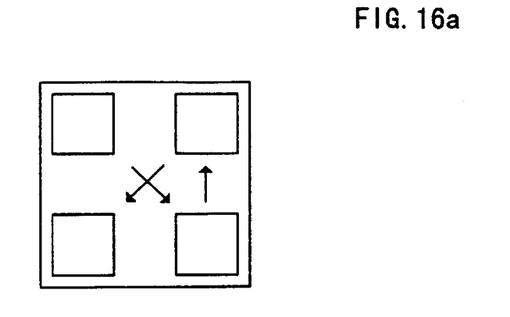
FIGS. 16a and 16b is an explanatory view for illustrating a process for setting a machining sequence other than existing machining patterns.
Figure 16B:
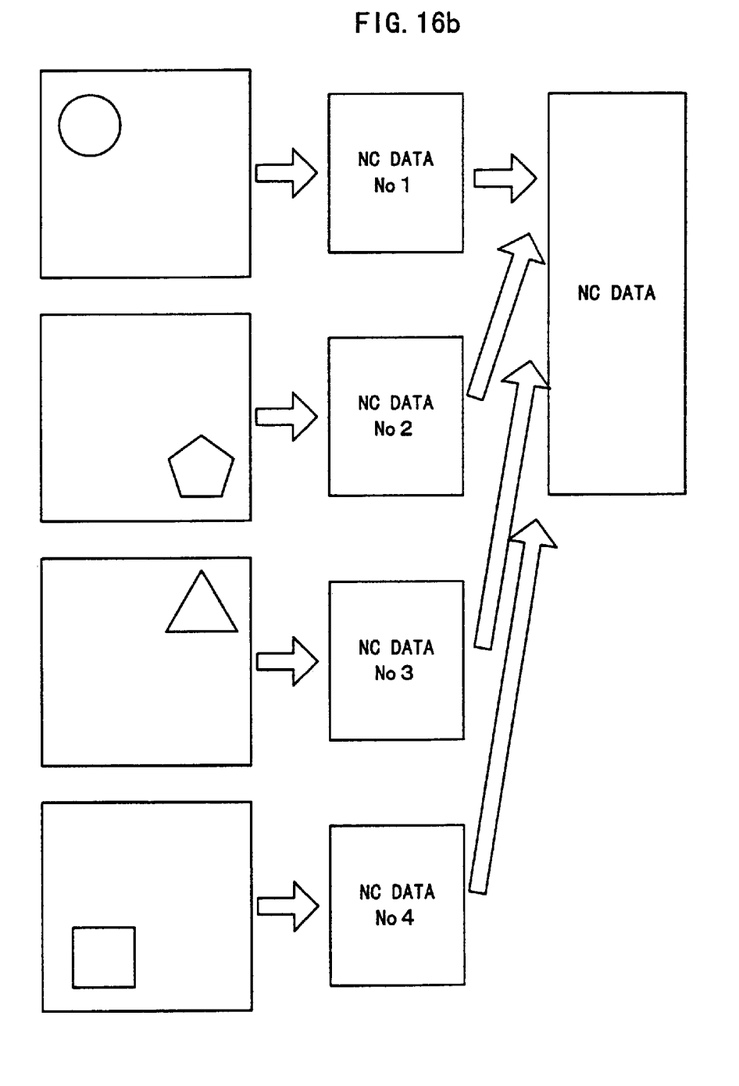

FIG. 13 and FIGS. 16a and 16b are a flowchart for illustrating the process for setting a machining sequence other than the existing patterns and views for illustrating the process, respectively. In order to edit a machining sequence using a machining pattern where the machining pattern shown in FIG. 16a does not exist, as shown in FIG. 16b, each machining shape is selected (Step S31), NC data are prepared for the selected machining shape (Step S32), and then the NC data are registered (Step S33). After the NC data are registered for all machining shapes, the NC data for machining the plurality of machining shapes can be formed by using these registered NC data (Steps S34 and S35).

Therefore, this method for setting a machining sequence has a problem in that the NC data must be registered in advance, so that the operation for preparing the NC data for wire-cut electric discharge machining is complex, and it is difficult to make a change with ease.

SUMMARY OF THE INVENTION

An object of the present invention is to provide a method of and an apparatus for determining a machining sequence of wire-cut electric discharge machining, in which a machining sequence for continuously machining a plurality of machining shapes can be altered easily. Particularly, the object of the present invention is to provide a machining sequence determining method and an apparatus for wire-cut electric discharge machining, in which a sequence of the plurality of machining shapes and a sequence of machining stages for the machining shapes can be altered.

The present invention can easily change a machining sequence in the case where a plurality of machining shapes are machined continuously, by editing a sequence of combinations of machining shapes and machining stages for the machining shapes.

The method for determining a machining sequence of a wire-cut electric discharge machining in accordance with the present invention can take two different modes. In a first mode, a plurality of standard machining patterns are prepared in advance, and a desired machining pattern is formed by altering the standard machining patterns. In a second mode, a desired machining pattern is formed by editing a sequence of combinations of a plurality of machining shapes and machining stages associated with a selected machining type.

The aforementioned two different modes, the first and second modes, can also be used for the apparatus for determining a machining sequence of a wire-cut electric discharge machining and a computer readable medium in accordance with the present invention.

The first mode of the method for determining a machining sequence of a wire-cut electric discharge machining according to the present invention comprises the steps of: preparing a plurality of machining patterns respectively defining combinations of machining objective shapes and machining stages for the machining objective shapes and a sequence of the combinations; selecting one machining pattern from the plurality of machining patterns; determining each of the machining objective shapes; explicating the selected machining pattern to enable to edit the sequence of the combinations; and editing and determining the sequence of the combinations in the explicated machining pattern.

Each machining stage is determined for each machining shape, and is selected from machining processes such as rough machining, semi-finish machining, finish machining and cut-off machining. In the so-called punch machining in which a portion where a machining shape is cut out of a workpiece is used as a product, cut-off machining is performed finally, while in the so-called die machining in which a remaining portion after a machining shape is cut out of a workpiece is used as a product, cut-off machining is performed initially.

Each machining pattern defines combinations of machining shape and machining stages for the machining shape and a sequence thereof. A plurality of machining patterns are prepared so as to be selectable. Also, the machining pattern may define the positions of the plurality of machining shapes on a workpiece. In determining the objective machining shapes, an operator can select the position of each machining shape on the workpiece.

The explication of the selected machining pattern enables to edit the sequence of combinations of the objective machining shapes and the machining stages for the objective machining shapes. An operator determines the machining sequence by editing the sequence of the explicated combination.

This results in an easy alteration of machining sequence in the case where a plurality of machining shapes are machined continuously.

The second mode of the method for determining a machining sequence of a wire-cut electric discharge machining according to the present invention comprises the steps of: preparing a plurality of machining types and machining stages for each of the machining types; selecting one machining type from the plurality of machining types; determining a plurality of machining objective shapes; explicating the determined machining objective shapes and the machining stages for the selected machining type to enable to edit a sequence of combinations of the machining objective shapes and the machining stages; and editing and determining the sequence of combinations of the explicated machining objective shapes and the machining stages.

The method in the second mode does not use the standard machining patterns which are used in the first mode. In the second mode, instead of using the standard machining patterns, the machining type of electric discharge machining is selected. This machining type of electric discharge machining is a basic type of machining method for machining individual machining shapes such as punching and die machining, or closed machining and open machining, and the aforementioned machining stages such as rough machining, semi-finish machining, finish machining, and cut-off machining are specified in advance for each of the machining types.

Therefore, in the method of the second mode, a machining type is selected for machining shapes, and then, like the first mode, the machining objective shapes and the machining stages for the selected machining type are explicated and a sequence of the combinations is edited, thereby alteration of machining sequence in the case where a plurality of machining shapes are machined continuously is made easy.

Like the method for determining a machining sequence, the apparatus for determining a machining sequence of a wire-cut electric discharge machining according to the present invention can also take two different modes in determining the sequence. The apparatus of the first mode defines a plurality of standard machining patterns in advance, and forms a desired machining pattern by altering the standard machining pattern, and therefore has means for realizing these processes. The apparatus of the second mode forms a desired machining pattern by altering the sequence of combinations of machining objective shapes and machining stages for a selected machining type, and therefore has means for realizing the process.

Further, the computer readable medium according to the present invention can take two different modes in determining the sequence, like the aforementioned method and apparatus for determining a machining sequence. The computer readable medium of the first mode stores data of machining patterns and programs for forming a desired machining pattern by altering the machining pattern selected from a plurality of standard machining patterns prepared in advance. The computer readable medium of the second mode stores programs for performing processes of forming a desired machining pattern by altering the sequence of combinations of machining objective shapes and machining stages for a selected machining type.

According to the present invention, the NC data can be prepared based on the standard machining pattern and also the unique machining NC data can be prepared in accordance with the know-how and ease-of-use of the user. Also, new machining operation which does not depend on the existing machining pattern can be performed easily.

Further, the preparation for performing the actual machining operation, which has conventionally been needed, is not required, and also the machining sequence can be checked. Further, the NC data need not be prepared for each of the plurality of machining shapes, and the NC data can be prepared by one process.

DETAILED DESCRIPTION OF THE PREFERRED EMBODIMENTS

Figure 1:
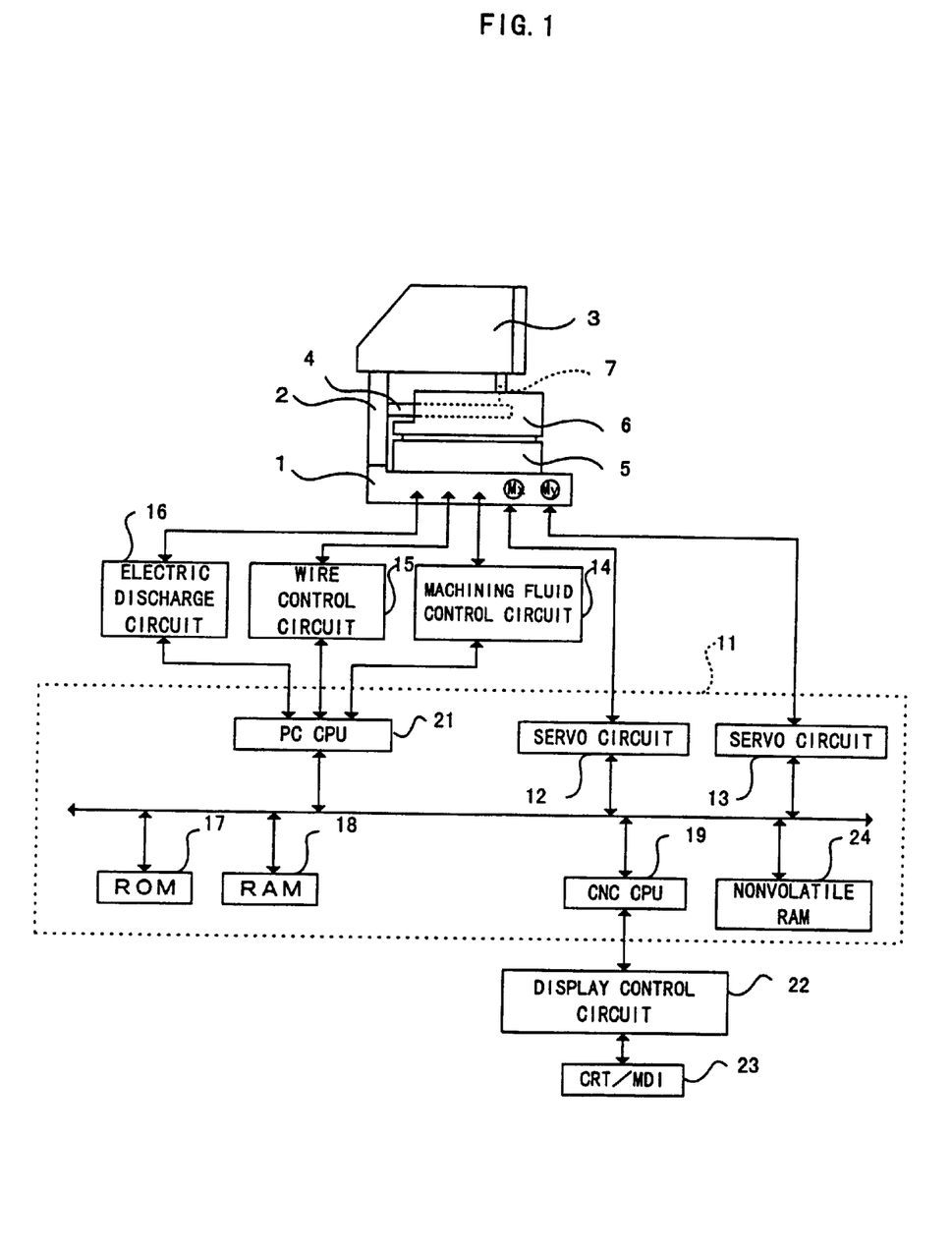
FIG. 1 is a schematic block diagram showing configurations of a wire-cut electric discharge machine and a controller thereof.
Figure 2:
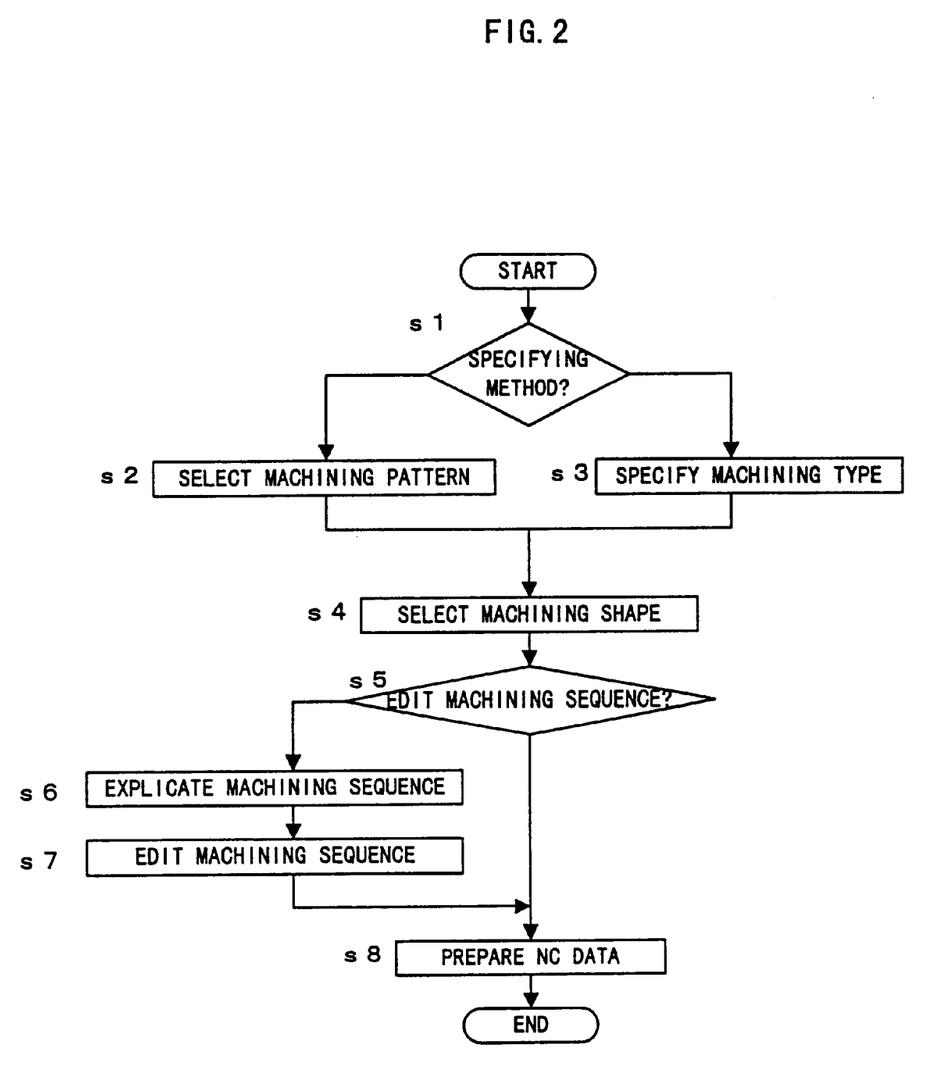
FIG. 2 is a flowchart for illustrating a process for determining a machining sequence of wire-cut electric discharge machining in accordance with the present invention.

FIG. 1 is a schematic block diagram showing an arrangement of a wire-cut electric discharge machine and a controller thereof. In FIG. 1, a wire-cut electric discharge machine has a belt 1, a post 2, a column 3, an arm 4, a cross table 5 and a machining tank 6. A controller 11 drivingly controls an X axis driving servomotor Mx and a Y axis driving servomotor My via servo control circuits 12 and 13, respectively. The cross table 5 moves in the X-Y plane by means of the servomotors Mx and My.

Further, the wire-cut electric discharge machine is provided with a machining fluid circulator for supplying a machining fluid to a jet nozzle of the column 3 and the machining tank 6, various motors for wire feed etc., an electric discharge machining power source for applying a machining voltage to a wire electrode. These elements are drivingly controlled by the controller 11 via a machining fluid control circuit 14, a wire control circuit 15 and an electric discharge control circuit 16, respectively.

The controller is provided with a CNC CPU 19 for drivingly controlling axes of the electric discharge machine in accordance with a system program stored in a ROM 17, a machining program stored in a RAM 18. Further, the CNC CPU 19 is connected to servo control circuits 12 and 13 via a bus 20 to output distribution pulses to the servo control circuits 12 and 13 for the axes in accordance with the machining program.

A PC CPU 21 drivingly controls the electric discharge control circuit 16, the wire control circuit 15 and the machining fluid control circuit 14 in accordance with the system program stored in the ROM 17 and the power source conditions and machining conditions stored in the RAM 18.

The CNC CPU 19 is connected to a manual data input device 23 with CRT via a display control circuit 22, by which the machining program, power source conditions and machining conditions can be inputted. Also, on the screen of the manual data input device 23 with CRT, monitor display of machining path and setting conditions and selection of menu items can be effected.

Further, definition of a machining shape and other operation can be preformed interactively with the display screen by operating a keyboard etc. on the manual data input device 23 with CRT while causing the CNC CPU 19 by executing a shape input program stored in the ROM 17. The defined machining shape is stored in the RAM 18.

The ROM 17 stores an application program for preparing NC data for wire-cut electric discharge machining based on the defined machining shape and machining conditions.

An application program for determining a machining sequence according to the present invention, in a first mode, includes data of a plurality of machining patterns defining the sequence of machining for a plurality of machining shapes and machining stages for electric discharge machining each machining shape and the sequence thereof, a functional program for selecting one machining pattern from the plurality of machining patterns, a functional program for selecting a machining shape subjected to electric discharge machining, a functional program for enabling alteration of sequence including one between the plurality of machining shapes by explicating or developing the selected machining pattern to the level of machining stage, a functional program for specifying the sequence of the explicated machining stages.

In a second mode, there are provided a functional program for selecting a machining method of electric discharge machining, a functional program for selecting one or more machining shapes subjected to electric discharge machining, a functional program for enabling alteration of sequence of the machining stages including a change of sequence between the plurality of machining shapes by explicating or developing the selected machining type to the level of machining stage, and a functional program for specifying the sequence of the explicatinged machining stages. These programs are stored in a storage medium which is readable by a computer.

Although in the above-described first and second modes, functional programs are divided classified according to function, all of them can be prepared as one functional program.

The aforementioned application program also stores a program of basic machining method for machining an individual machining shape, such as punching and die machining or closed machining and open machining, as an electric discharge machining method used in the second mode, and a program for realizing the basic operations of electric discharge machine in each machining stage. The basic operations performed by the electric discharge machine include machining preparation, electric discharge on, approach operation, contour forward machining operation, contour backward machining operation, evacuating operation, movement to approach start point, residual stock cutting operation, wire-cutting, wire connection, electric discharge off, finish of machining, and the like.

The aforementioned basic operations are publicly known ones on the electric discharge machine and have no direct connection with the present invention, so that detailed description is omitted.

Figure 3A:
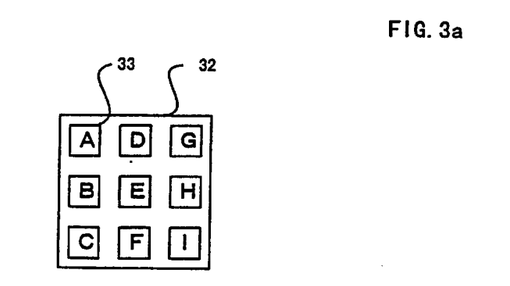
FIGS. 3a and 3b, FIG. 4, and FIG. 5 are views for illustrating a first mode of the present invention.
Figure 3B:
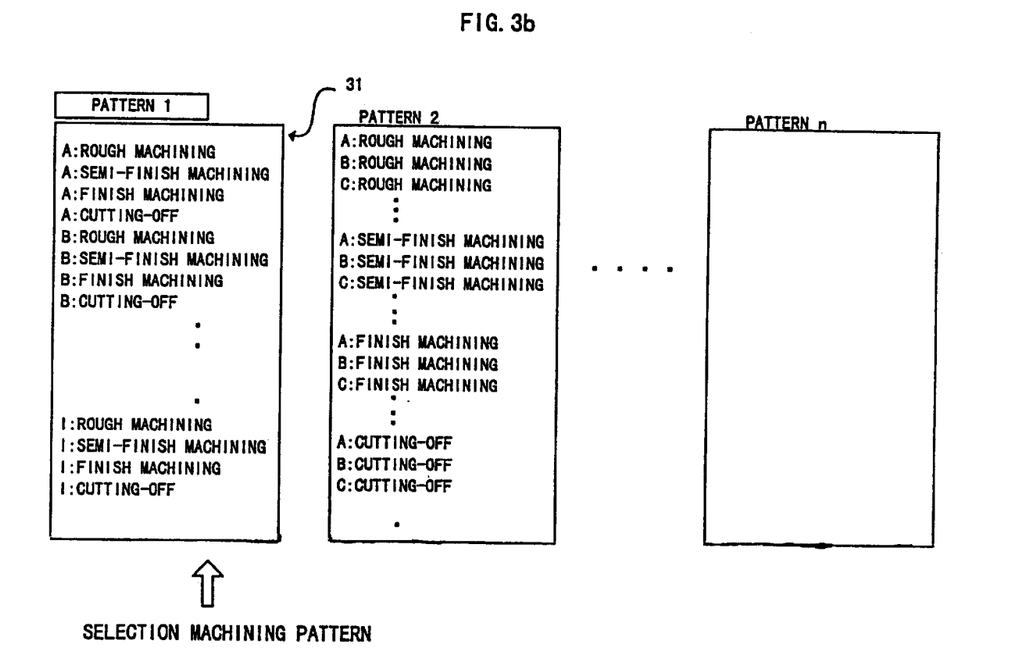
Figure 4:
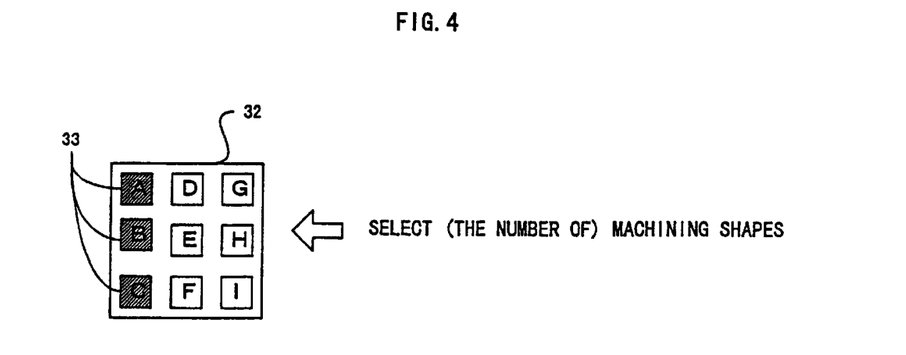
Figure 5:
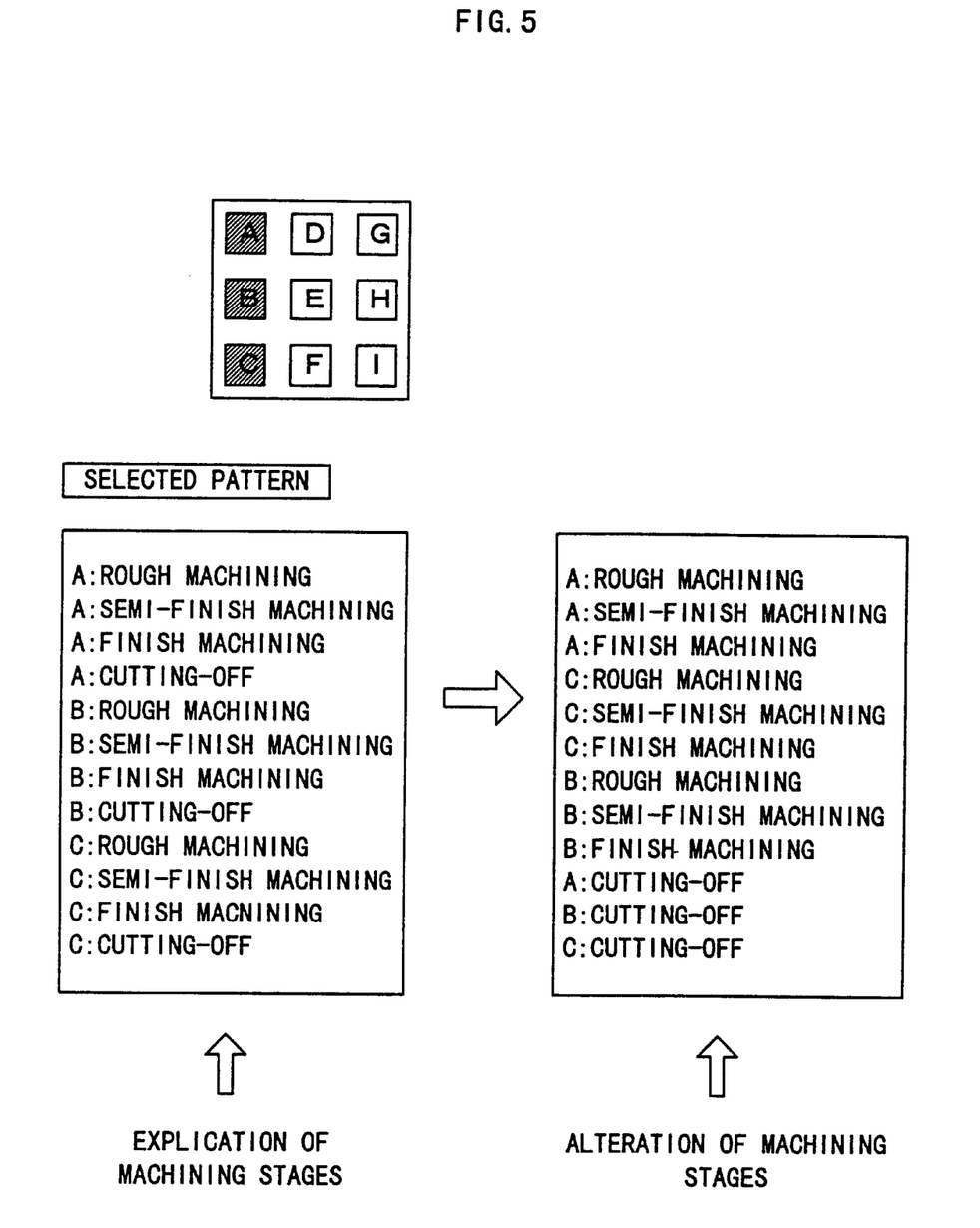
Figure 6A:
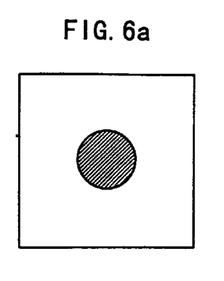
FIGS. 6a, 6b, 6c, 7 and 8 are views for illustrating a second mode of the present invention.
Figure 6B:
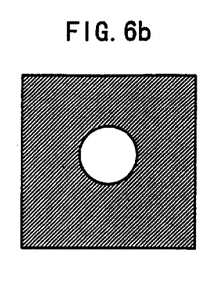
Figure 6C:
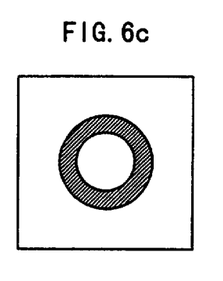
Figure 7:
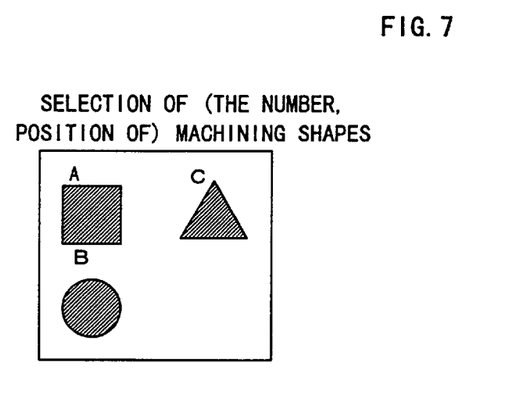
Figure 8:
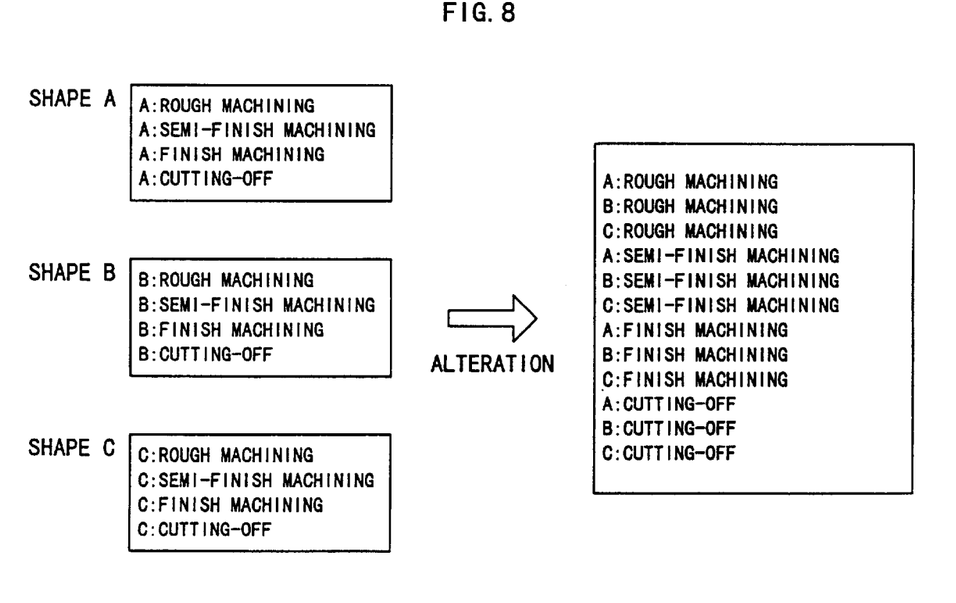

Next, a process for determining a machining sequence of wire-cut electric discharge machining in accordance with the present invention will be described with reference to a flowchart of FIG. 2 and FIGS. 3 to 8. The process of the first mode of the present invention is performed by following Steps S1, S2, and S4 to S8, and the process of the second mode is performed by following Steps S1, S3, and S4 to S8. FIGS. 3 to 5 are views for illustrating the first mode, and FIGS. 6 to 8 are views for illustrating the second mode.

In the first mode, a plurality of standard machining patterns are defined in advance, and a desired machining pattern is prepared by altering the standard machining pattern. In the second mode, standard machining patterns are not prepared, and a desired machining pattern is prepared by altering the sequence of machining stages for each machining shape.

First, either the first mode or the second mode is selected and specified (Step S1).

In the case where the first mode is designated, a machining pattern to be used is selected from the standard machining patterns stored in the ROM 17 etc. Selection of the machining pattern can be performed by specifying the machining pattern from candidate machining patterns displayed on the CRT using an input device. FIG. 3b shows machining patterns 31 each defining a sequence of machining stages for each shape.

In Step S4, objective shapes 33 of machining are determined as shown in FIG. 4 and at the same time positions of the objective shapes 33 on a workpiece 32 are determined.

Each machining pattern 31 defines standard machining stages for the machining shapes A–I as shown in FIG. 3a, and a plurality of patterns with different combinations of machining shapes and machining stages. For example, in FIG. 3b, pattern 1 defines a sequence in which stages of rough machining, semi-finish machining, finish machining and cut-off machining are continuously performed on each of the machining shapes A, B, . . . , I. Pattern 2 defines a sequence in which stages of rough machining, semi-finish machining, finish machining and cut-off machining are respectively and collectively performed on each of the machining shapes A, B, . . . , I. In addition to these patterns, machining patterns each defining a different sequence of combinations of the machining shapes and machining stages are prepared.

Thus, it is determined which machining pattern should be adopted as a basic sequence pattern on which combinations of the objective shapes and the machining states are edited. FIG. 3b exemplifies machining patterns including cut-off machining. For the machining which does not require cut-off machining, a machining pattern excluding cut-off machining is prepared. Alternatively, the machining sequence excluding cut-off machining can be prepared by removing cut-off machining in editing the machining pattern including cut-off machining.

FIG. 3b shows a state in which pattern 1 is selected from the machining patterns 31. FIG. 4 shows a state in which the machining shapes are selected and determined at positions of A, B and C. At this time, the number of the machining shapes is determined (Steps S2 and S4).

The next Steps S5, S6, and S7 are processes for editing the machining sequence. In the machining pattern selected in the aforementioned Steps S2 and S4, if it is not necessary to alter the sequence of the machining shapes and machining stages (Step S5), NC data are prepared by using that machining sequence (Step S8) and the ordinary machining operations are performed by the electric discharge machine.

On the other hand, in Step S5, if it is necessary to alter the sequence of the machining shapes and machining stages in the selected pattern, the selected pattern is explicated or developed to alter the machining sequence. In the explication or development to the machining stage level, the machining pattern is decomposed into machining process level such as rough machining, semi-finish machining, finish machining and cut-off machining included in the machining pattern so as to enable to alter the sequence of the decomposed machining processes, and the machining processes are displayed on the CRT. The machining stages in the explicated state are shown in FIG. 5. This explication or development enables alteration not only on the sequence of the machining stages for one machining shape but also between the machining stages associated with respective machining shapes (Step S6).

Further, the machining sequence including the sequence of the plurality of objective machining shapes can be edited with specifying the associated sequence of the explicated machining stages. For specifying the machining sequence, the input device can be used. FIG. 5 shows at the right below a state in which the sequence of machining shapes and machining stages have been altered (Step 7).

By explicating the machining stages and specifying the explicated machining stages for the plurality of machining shapes as described above, the machining sequence for continuously machining the plurality of machining shapes can be altered easily. Also, alteration of machining sequence between the plurality of machining shapes and between the machining stages can be made.

Subsequently, NC data are prepared by using the machining sequence in aforementioned Step S8 and then the ordinary machining operations by the electric discharge machine are performed.

The following is a description of the edition of machining sequence in the second mode. In this case, the second mode is selected and specified in Step S1.

When the second mode is specified, a machining type to be used is selected from a plurality of machining types stored in the ROM 17. As the machining types, there are basic machining methods for machining individual machining shapes, such as punching in which a portion where a machining shape is cut out of a workpiece is used as a product, die machining in which a remaining portion of a workpiece after a machining shape is cut out is used as a product, and closed machining and open machining. The machining stages such as rough machining, semi-finish machining, finish machining and cut-off machining are specified for each machining method. The machining type can be selected by displaying candidate machining types on the CRT and by specifying the machining type by using the input device. FIGS. 6a, 6b and 6c each show one example of machining type (Step S3).

In Step S4, objective shapes of machining are determined. In the second mode, the machining shapes of parts and dies, etc. which are subjected to machining are selected, and also the positions of the selected machining shapes on a workpiece are specified. FIG. 7 shows a state in which the machining shapes are selected. In this case, the machining shapes are A, B and C. At this time, the number of machining shapes are also selected simultaneously with the selection of machining positions (Step S4).

The next Steps S5, S6, and S7 show processes for editing the machining sequence. The machining sequence as to the machining type and machining shapes selected in the aforementioned Steps S3 and S4 is determined in Steps S6 and S7. In the second mode, Step S5 is omitted because the machining sequence is usually edited.

As shown in FIG. 8, the machining stages associated with the specified machining type are explicated or developed for each shape (Step S6), and the sequence of the explicated machining stages including the sequence of the machining objective shapes is edited and specified to determine the machining sequence including the sequence of the plurality of machining shapes. To specify the machining sequence, the input device can be used.

By selecting the machining type, explicating the machining stages, and specifying the explicated machining stages for the plurality of machining shapes as described above, the machining sequence for continuously machining the plurality of machining shapes can be altered easily. Also, alteration of machining sequence on the plurality of machining shapes and on the machining stages are made possible.

Subsequently, NC data are prepared by using the determined machining sequence in the aforementioned Step S8, and then the ordinary machining operations by the electric discharge machine are performed.

According to the first and second modes, by using the selected machining pattern or machining type, the machining stages for each machining shape are explicated and the sequence of the explicated machining stages including the sequence of the plurality of machining shapes is specified. Thereby, the NC data based on the standard machining pattern can be prepared and also the unique machining NC data can be prepared in accordance with the know-how and ease-of-use of the user.

Further, according to the first and second modes, the machining stages such as rough machining, semi-finish machining, finish machining, and cut-off machining are developed for each machining shape. Thereby, the operation for preparing the actual machining operation, which has conventionally been needed, is not required, and also the machining sequence can be checked.

Also, according to the first and second modes, the machining stages can be specified for the plurality of machining shapes. Therefore, the NC data need not be prepared for each machining shape, and the NC data can be prepared by one process.

Also, according to the second mode, the machining type corresponding to the machining shape is selected, the machining stages of each machining shape are developed by using the machining type, and the machining sequence can be specified. Therefore, new machining operation which does not depend on the existing machining pattern can be performed easily.

As described above, according to the present invention, in editing the machining sequence of wire-cut electric discharge machining, the machining sequence in which a plurality of machining shapes are machined continuously can be changed easily. Also, the machining sequence between the plurality of machining shapes and between the machining stages can be changed.

What is claimed is:

1. A method of determining a machining sequence of wire-cut electric discharge machining for continuously machining a plurality of machining shapes through a plurality of machining stages, said method comprising:
   (a) preparing a plurality of machining patterns respectively defining combinations of machining objective shapes and machining stages for the machining objective shapes and a sequence of the combinations;
   (b) selecting one machining pattern from said plurality of machining patterns;
   (c) determining each of the machining objective shapes;
   (d) explicating the selected machining pattern to enable to edit the sequence of said combinations; and
   (e) editing and determining the sequence of said combinations in said explicated machining pattern.

2. A method of determining a machining sequence of wire-cut electric discharge machining for continuously machining a plurality of machining shapes through a plurality of machining stages, said method comprising:
   (a) preparing a plurality of machining types and machining stages for each of said machining types;
   (b) selecting one machining type from said plurality of machining types;
   (c) determining a plurality of machining objective shapes;
   (d) explicating the determined machining objective shapes and the machining stages for the selected machining type to enable to edit sequence of combinations of the machining objective shapes and the machining stages; and
   (e) editing and determining the sequence of combinations of said explicated machining objective shapes and machining stages.

3. The method of determining a machining sequence of wire-cut electric discharge machining according to claim 1, wherein each of said machining stages is selected from one of rough machining, semi-finish machining, finish machining and cut-off machining.

4. The method of determining a machining sequence of wire-cut electric discharge machining according to claim 1, wherein respective positions of said machining objective shapes on a workpiece are specified to be associated with said machining objective shapes, and said operation (c) includes a step of selecting a position of each machining objective shape on the workpiece.

5. An apparatus for determining a machining sequence of wire-cut electric discharge machining for machining a plurality of machining shapes through a plurality of machining stages, comprising:
   a storage unit storing a plurality of machining patterns respectively defining combinations of objective shape of machining and machining stages for the objective shapes and a sequence of the combinations;
   an input unit selecting one machining pattern from said machining patterns and for determining each of the objective shapes;
   an explicating unit explicating said selected machining pattern to enable to edit the sequence of said combinations; and an editing unit editing and determining the sequence of said combinations in said explicated machining pattern.

6. An apparatus for determining a machining sequence of wire-cut electric discharge machining for machining a plurality of machining shapes through a plurality of machining stages, comprising:

a selecting unit selecting one machining type from a plurality of machining types prepared in advance;

an input unit determining a plurality of objective shapes of machining;

an explicating unit explicating the determined objective shapes and machining stages associated with the selected machining type to enable to edit a sequence of combinations of the objective shapes and the machining stages; and an editing unit editing and determining the sequence of combinations of said explicated objective shapes and machining stages.

7. The apparatus for determining a machining sequence of wire-cut electric discharge machining according to claim 5, wherein each of said machining stages is selected from one of rough machining, semi-finish machining, finish machining and cut-off machining.

8. The apparatus for determining a machining sequence of wire-cut electric discharge machining according to claim 5, wherein respective positions of said machining objective shapes on a workpiece are specified to be associated with said machining objective shapes, and a position of each machining objective shape on the workpiece is selected by said selecting means.

9. A computer readable medium storing programs for determining a machining sequence of wire-cut electric discharge machining for machining a plurality of machining shapes through a plurality of machining stages, said medium storing:

data of a plurality of machining patterns respectively defining combinations of objective shapes of machining and machining stages for the objective shapes and a sequence of the combinations; and programs for performing:

a process of selecting one machining pattern from said machining patterns and determining each of the objective shapes;

a process for explicating said selected machining pattern to enable to edit the sequence of said combinations; and a process for editing and determining the sequence of said combinations in said explicated machining pattern.

10. A computer readable medium storing programs for determining a machining sequence of wire-cut electric discharge machining for machining a plurality of machining shapes through a plurality of machining stages, said medium storing programs for performing:

a process for selecting one machining type from a plurality of machining types prepared in advance;

a process for determining a plurality of objective shapes of machining;

a process for explicating the determined objective shapes and machining stages associated with the selected machining type to enable to edit a sequence of combinations of the objective shapes and the machining stages; and a process for editing and determining the sequence of combinations of said explicated objective shapes and machining stages.

11. The recording medium according to claim 9, wherein each of said machining stages is selected from one of rough machining, semi-finish machining, finish machining and cut-off machining, and respective positions of said machining objective shapes on a workpiece are specified to be associated with said machining objective shapes.

* * * * *